United States Patent
Webster et al.

(10) Patent No.: US 10,648,342 B2
(45) Date of Patent: May 12, 2020

(54) ENGINE COMPONENT WITH COOLING HOLE

(71) Applicant: GENERAL ELECTRIC COMPANY, Schenectady, NY (US)

(72) Inventors: Zachary Daniel Webster, Mason, OH (US); Aaron Ezekiel Smith, Hermosa Beach, CA (US); Steven Robert Brassfield, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 15/844,684

(22) Filed: Dec. 18, 2017

(65) Prior Publication Data

US 2019/0186272 A1    Jun. 20, 2019

(51) Int. Cl.
*F01D 5/18* (2006.01)
*F01D 5/14* (2006.01)
*F23R 3/00* (2006.01)

(52) U.S. Cl.
CPC ............. *F01D 5/186* (2013.01); *F01D 5/141* (2013.01); *F23R 3/002* (2013.01); *F23R 3/005* (2013.01); *F05D 2260/202* (2013.01); *F23R 2900/03042* (2013.01)

(58) Field of Classification Search
CPC .................................. F01D 5/186; F01D 5/187
USPC ....................................................... 416/97 R
See application file for complete search history.

(56) References Cited

U.S. PATENT DOCUMENTS

| | | | |
|---|---|---|---|
| 4,529,358 A | 7/1985 | Papell | |
| 4,992,025 A | 2/1991 | Stroud et al. | |
| 5,419,681 A | 5/1995 | Lee | |
| 6,979,176 B2 | 12/2005 | Nakamata et al. | |
| 7,273,351 B2 | 9/2007 | Kopmels | |
| 8,047,001 B2* | 11/2011 | Beeck | F01D 5/18 415/116 |
| 8,066,485 B1* | 11/2011 | Liang | F01D 5/186 415/115 |
| 8,449,254 B2 | 5/2013 | Devore et al. | |
| 9,279,330 B2* | 3/2016 | Xu | F01D 5/186 |
| 9,316,104 B2 | 4/2016 | Xu | |
| 9,327,446 B2 | 5/2016 | Clark et al. | |
| 9,599,411 B2 | 3/2017 | Tanaka et al. | |
| 2016/0273363 A1* | 9/2016 | Bunker | F01D 9/065 |
| 2017/0306764 A1* | 10/2017 | Konitzer | F01D 5/186 |

* cited by examiner

*Primary Examiner* — Woody A Lee, Jr.
*Assistant Examiner* — Michael L Sehn
(74) *Attorney, Agent, or Firm* — McGarry Bair PC (57) ABSTRACT

An apparatus and method an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction. The airfoil further includes at least one cooling hole including a diffusing section and fluidly coupling an exterior of the engine component to an exterior of the engine component.

21 Claims, 6 Drawing Sheets

ENGINE COMPONENT WITH COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil or blade, a platform and a dovetail mounting portion. The turbine blade assembly includes cooling inlet passages as part of serpentine circuits in the platform and blade used to cool the platform and blade. The serpentine circuits can extend to cooling holes located along any of the multiple surfaces of the blade including at the tip. Nozzles having inner and outer bands formed from stationary vanes and combustor liners surrounding the combustor of the engine can also utilize cooling holes and/or serpentine circuits.

BRIEF DESCRIPTION OF THE INVENTION

In one aspect, the present disclosure relates to a component for a turbine engine, which generates a hot gas fluid flow, and provides a cooling fluid flow, comprising an outer wall separating the hot gas flow from the cooling fluid flow and having a heated surface along which the hot gas flows and a cooled surface facing the cooling fluid flow, and at least one cooling hole comprising an inlet at the cooled surface and at least two outlets at the heated surface, a furcated cooling passage having a trunk extending inlet and branches extending from the trunk to the at least two outlets, with an interior diffusing section formed in the trunk at a junction with the branches and exterior diffusing sections defining the at least two outlets. One or more connecting metering sections is located between the interior diffusing section and the exterior diffusing sections.

In another aspect, the present disclosure relates to an airfoil for a turbine engine, which generates a hot gas flow, and provides a cooling fluid flow, comprising an outer wall separating the hot gas flow from the cooling fluid flow and having a heated surface along which the hot gas flows and a cooled surface facing the cooling fluid flow, and at least one cooling hole comprising an inlet at the cooled surface and at least two outlets at the heated surface, a furcated cooling passage having a trunk extending inlet and branches extending from the trunk to the at least two outlets, with an interior diffusing section formed in the trunk at the junction with the branches and exterior diffusing sections defining the at least two outlets. One or more connecting metering sections is located between the interior diffusing section and the exterior diffusing sections.

In yet another aspect, the present disclosure relates to a method of cooling an engine component with at least one cooling hole extending through an outer wall of the engine component between an inlet along a cooled surface facing a cooling fluid flow and at least two outlets along a heated surface along which hot gas flows. The method comprises flowing the cooling fluid flow through an interior diffusion section of the at least one cooling hole to form a first diffused airflow, splitting the first diffused airflow into multiple branches, flowing the first diffused airflow through a connecting metering section in each of the multiple branches, diffusing the first diffused airflow in each of the multiple branches after flowing the first diffused airflow through the connecting metering section to form a second diffused airflow, and emitting the second diffused airflow onto the heated surface.

DETAILED DESCRIPTION OF THE INVENTION

Aspects of the disclosure described herein are directed to the formation of at least one cooling hole having a furcated cooling passage including a trunk with an interior diffusing section and branches having exterior diffusing sections and defining at least two outlets. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
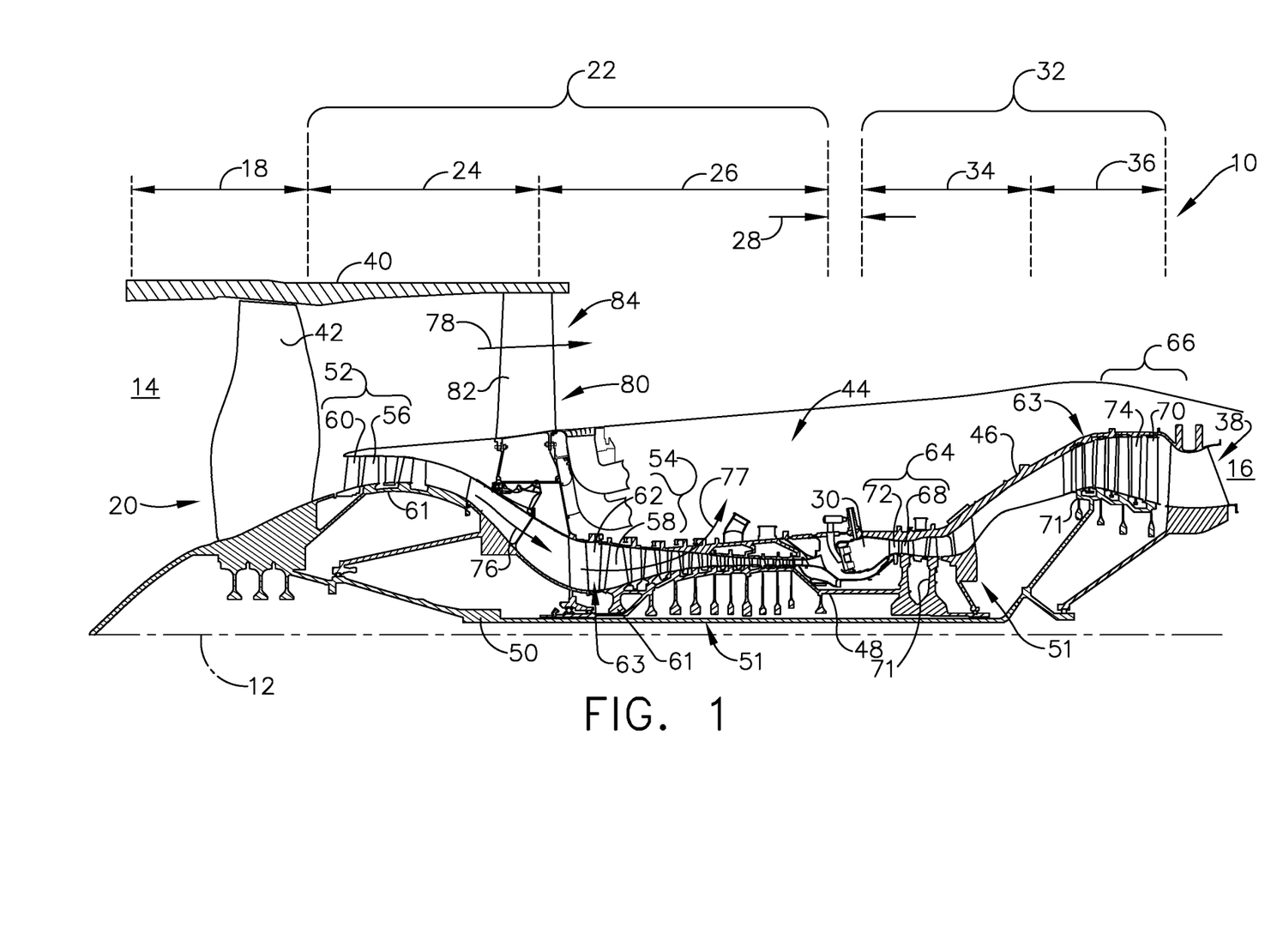
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
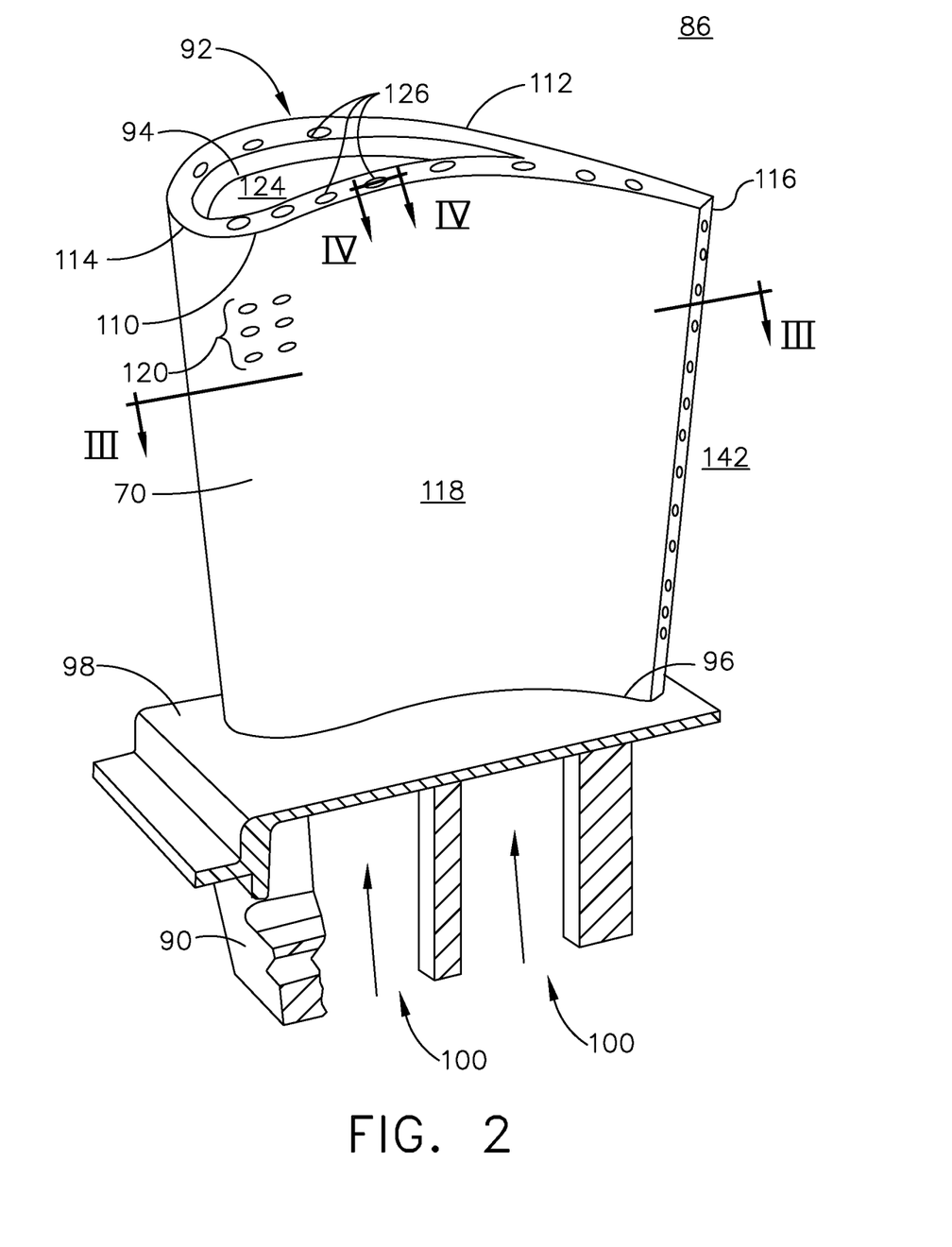
FIG. 2 is a perspective view of a turbine blade including at least one cooling hole.

FIG. 2 is a perspective view of a turbine blade assembly 86 with an engine component in particular a turbine blade 70 of the engine 10 from FIG. 1. Alternatively, the engine component can include a vane, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape extending between a leading edge 114 and a trailing edge 116 to define a chord-wise direction. The airfoil 92 is bound by an outer wall 118 and defined by the pressure and suction sides 110, 112. A set of film cooling holes 120 can be located along any portion of the outer wall 118 including proximate the leading edge 114 on the pressure side 110.

Figure 3:
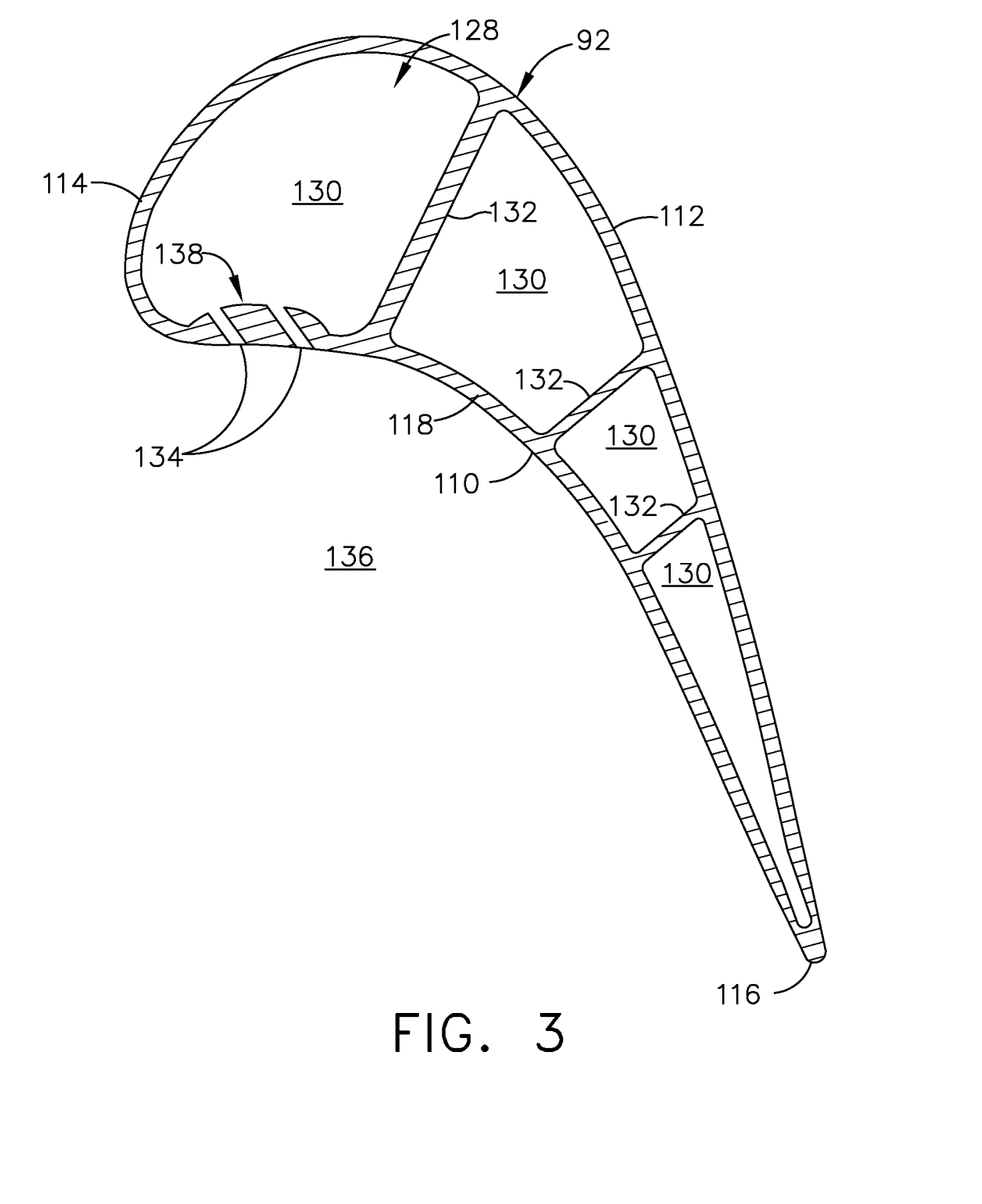
FIG. 3 is a cross-section of the turbine blade from FIG. 2 taken along line III-III.

Turning to FIG. 3 an interior 128 is bound by outer wall 118 and can include multiple cooling passages 130. The multiple cooling passages 130 can be fluidly coupled with at least one of the inlet passages 100 (FIG. 2). The multiple cooling passages 130 can be separated by interior walls 132. Interior walls 132 can extend between the pressure and suction sides as illustrated, and in other non-limiting examples can be any wall within the airfoil and defining at least a portion of the multiple cooling passages 130. At least one cooling hole 134 can fluidly couple the interior 128 of the airfoil 92 to an exterior 136 of the airfoil 92. In an aspect of the disclosure herein, a thickened wall portion 138 local to a location of the at least one cooling 134 on the interior 128 of the cooling passages 130 is formed in order to lengthen the at least cooling hole 134.

It is contemplated that the at least one cooling hole 134 can be part of any set of cooling holes, by way of non-limiting example the set of film cooling holes 120 as described herein. The at least one cooling hole 134 can pass through a substrate, which by way of illustration is outer wall 118. It should be understood, however, that the substrate can be any wall within the engine 10 including but not limited to the interior walls 132, the tip wall 122, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by, in non-limiting examples, 3D printing, investment casting, or stamping.

Figure 4A:
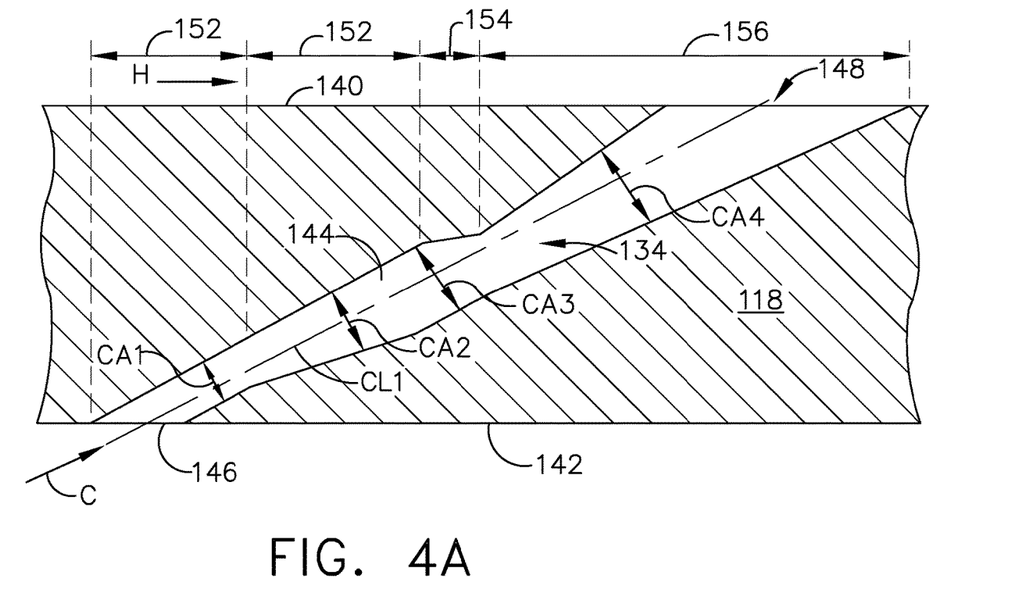
FIG. 4A is a schematic side sectional view of the at least one cooling hole from FIG. 2 according to an aspect of the disclosure discussed herein.

The at least one cooling hole 134 is illustrated in more detail in FIG. 4A. The outer wall 118 extends between an exterior, or a heated surface 140, facing a hot gas flow (H), and an interior, or a cooled surface 142, facing a cooling fluid flow (C). It should be understood that the heated surface 140 and the cooled surface 142 are relative to each other and can be any range of temperatures during engine operation.

It is noted that the outer wall 118 as described herein is shown generally planar, however it is understood that the outer wall 118 can be for curved engine components. The curvature of an engine component in such an example can be slight in comparison to the size of the cooling hole 134, and so for purposes of discussion and illustration is shown as planar. Whether the outer wall 118 is planar or curved local to the at least one cooling hole 134, the hot and cooled surfaces 140, 142 can be parallel to each other as shown herein or can lie in non-parallel planes.

Figure 4B:
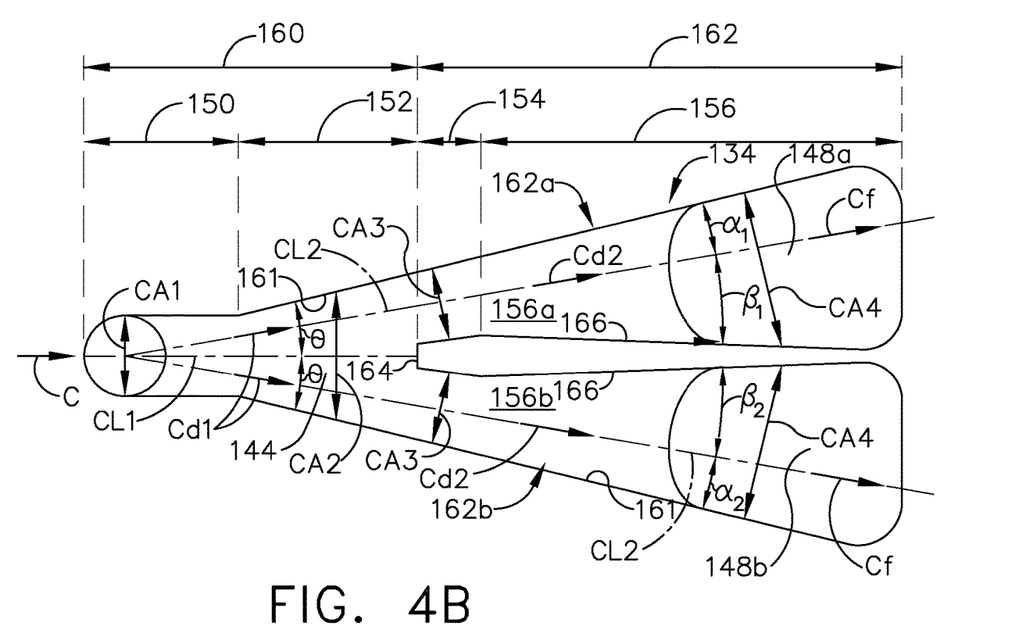
FIG. 4B is a schematic top sectional view of the at least one cooling hole in FIG. 4A.

A furcated cooling passage 144 has a trunk 160 with multiple branches 162, (FIG. 4B) with the trunk extending from an inlet 146 provided on the cooled surface 142 and the multiple branches forming outlets 148 provided on the heated surface 140 to define the at least one cooling hole 134. Furcated, as shown in FIG. 4B, refers to a cooling passage divided into two or more branches. The furcated cooling passage 144 can include an interior metering section 150 having a circular cross-sectional area (CA1), though any cross-sectional shape is contemplated. The interior metering section 150 can be provided at or near the inlet 146.

An interior diffusing section 152 can be located downstream of the interior metering section 150. The interior diffusing section 152 can be defined by an increasing second cross-sectional area (CA2), by way of non-limiting example a conical section. A first centerline (CL1) can pass through a geometric center of the second cross-sectional area (CA2) of the interior diffusing section 152. The increasing second cross-sectional area (CA2) can increase along the first centerline (CL1) in the cooling fluid flow (C) direction. It is contemplated that the at least one cooling hole 134 is inclined such that the first centerline (CL1) is non-orthogonal to the hot and cooled surfaces 140, 142. It is further contemplated that the first centerline (CL1) is orthogonal to one or both of the hot and cooled surfaces 140, 142. The orientation and geometry of the centerline (CL1) is shown for illustrative purposes only and should not be limiting.

At least one connecting metering section 154 can be fluidly coupled to the interior diffusing section 152 and be located downstream of the interior diffusing section 152. The at least one connecting metering section 154 can have a third cross-sectional area (CA3) that is, by way of non-limiting example a decreasing third cross-sectional area (CA3) in the cooling fluid flow (C) direction. More specifically, the connecting metering section 154 can exhaust into exterior diffusing sections 156 through a smaller cross-sectional area (CA3) than the cross-sectional area (CA3) with which the connecting metering section 154 started. The at least one connecting metering section 154 can be multiple connecting metering sections 154 each having third cross-sectional areas (CA3) smaller than the second cross-sectional area (CA2) with which the interior diffusing section 152 ends.

Exterior diffusing sections 156 are fluidly connected to interior diffusing section 152, by way of non-limiting example, via the at least one connecting metering section 154. The exterior diffusing sections 156 can be defined by an increasing fourth cross-sectional area (CA4), by way of non-limiting example a conical section. The exterior diffusing sections 156 terminate in outlets 148, though appearing as only one outlet, are at least two outlets 148.

It should be understood that the cross-sectional areas (CA1, CA2, CA3, CA4) can be of any shape and are not limited to the shapes described herein. The furcated cooling passage 144 can define cross-sectional areas having, by way of non-limiting example circular, oval, elliptical, racetrack, or rounded rectangular shapes. Each cross-sectional area can have different shapes.

FIG. 4B is a top-view of the at least one cooling hole 134 looking towards the heated surface 140 along a lateral plane with respect to the outer wall 118. The hot and cooled surfaces 140, 142 have been removed for clarity. It can more clearly be seen that the furcated cooling passage 144 includes the trunk 160 in which the interior diffusing section 152 is formed. It is further contemplated that the interior metering section 150 is also formed in the trunk 160. Sidewalls 161 diverge to define interior diffusing section 152 and the increasing third cross-sectional area (CA3). A first side angle ⊖ can be measured from the first centerline (CL) to sidewalls 161.

The branches 162, by way of non-limiting example a first branch 162a and a second branch 162b, extend from the trunk 160 at a junction 164 between the interior diffusing section 152 and the exterior diffusing sections 156 to define at least a portion of the exterior diffusing sections 156. The first branch 162a can include a first exterior diffusing section 156a and the second branch 162b can include a second exterior diffusing section 156b. It is further contemplated that the at least one connecting metering section 154 is two connecting metering sections 154a, 154b extending from the junction 164 to couple the interior diffusing section 152 to the first and second exterior diffusing sections 156a, 156b respectively. The sidewalls 161 can be continuous sidewalls 161 defining portions of both the trunk 160 and the branches 162.

The first and second exterior diffusing sections 156a, 156b define the at least two outlets 148, illustrated as first and second outlets 148a, 148b. The branches 162 can define branch centerlines, illustrated as second centerlines (CL2) that can pass through a geometric center of the first cross-sectional area (CA1) and a geometric center of the third cross-sectional area (CA3). The at least two outlets 148 are asymmetrical about the second centerlines (CL2). The geometrical center of the cross-sectional area (CA4) does not lie on the corresponding one of the branch centerlines (CL2) at the intersection of the cross-sectional area (CA4) and the branch centerline (CL2). A second side angle α, illustrated as two second side angles $α_1$, $α_2$, can be measured from the second centerlines (CL2) to the sidewalls 161. It is contemplated that the first side angle ⊖ is greater than the second side angle α. By way of non-limiting example the first side angle ⊖ is 7° and the second side angle α is 5°. In the case where two branches 156a, 156b extend from the trunk 160, the asymmetry enables maximum coverage with a minimal footprint.

In another aspect of the disclosure herein a third side angle β, illustrated as two third side angles $β_1$, $β_2$ can be measured from the second centerlines (CL2) to a sidewall 166 opposite the continuous sidewall 161. It is contemplated that the third side angle β is equal to the first side angle ⊖.

The cooling fluid flow (C) can flow along the first centerline (CL1) through the interior metering section 150 where metering of the mass flow rate of the cooling fluid flow (C) can occur. The cooling fluid flow (C) is then diffused in the interior diffusing section 152 in serial flow communication with the interior metering section 150. The cooling fluid flow (C) expands to form a wider and slower first diffused airflow (Cd1). The first diffused airflow (Cd1) passes through the connecting metering section 154 where metering of the mass flow rate of the first diffused airflow (Cd1) can occur. The first diffused airflow (Cd1) can then be diffused again in the exterior diffusing sections 156 to form a second diffused airflow (Cd2). The second diffused airflow (Cd2) exits at the at least two outlets 148 forming a cooling fluid film (Cf).

A method of cooling the engine component as described herein includes flowing the cooling fluid flow (C) through the interior diffusion section 152 to form a first diffused airflow (Cd1) and splitting the first diffused airflow (Cd1) into multiple branches 162. Furthermore, the first diffused airflow (Cd1) flows through the exterior diffusion sections 156 to form a second diffused airflow (Cd2). The method further includes emitting the second diffused airflow (Cd2) onto the heated surface 140 (FIG. 4A).

The method can include flowing the first diffused airflow (Cd1) through the connecting metering section 154 prior to diffusing the first diffused airflow (Cd1) in each of the multiple branches 162. Additionally the method can include flowing the cooling fluid flow (C) through the interior metering section 150 prior to flowing the cooling fluid flow (C) through the interior diffusing section 152. It should be understood that the at least one cooling hole 134 can include metering sections 150, 152 as described herein. However, it is also contemplated that the at least one cooling hole 134 includes none or only one metering section, and the metering sections as described herein are for illustrative purposes only and not meant to be limiting.

Figure 5A:
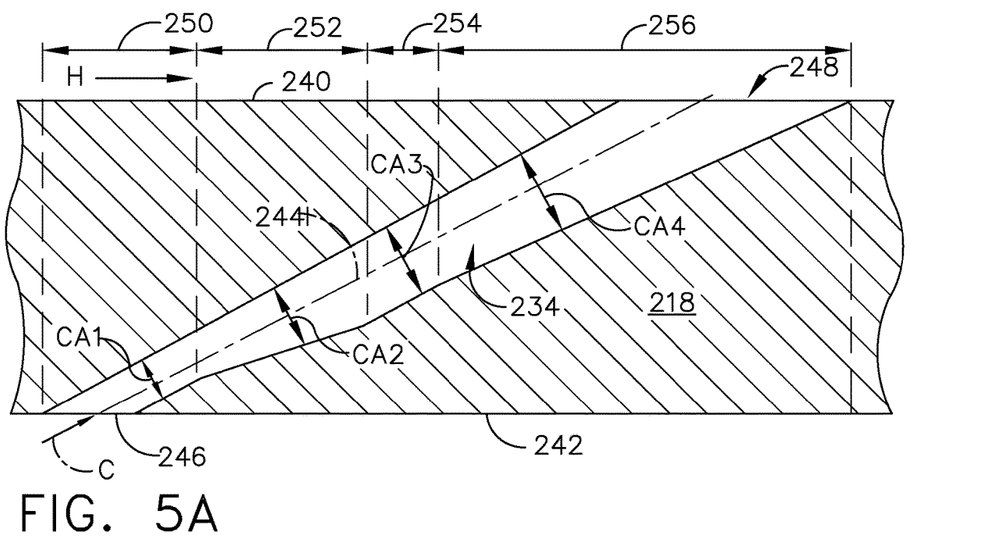
FIG. 5A is a schematic side sectional view of the at least one cooling hole from FIG. 2 according to another aspect of the disclosure discussed herein.

FIG. 5A is a cooling hole 234 according to another aspect of the disclosure discussed herein. The cooling hole 234 is substantially similar to the at least one cooling hole 134 of FIG. 4A. Therefore, like parts will be identified with like numerals increased by 100, with it being understood that the description of the like parts of the at least one cooling hole 134 applies to the cooling hole 234 unless otherwise noted.

The cooling hole 234 can include in fluid communication, an interior metering section 250, an interior diffusing section 252, at least one connecting metering section 254, and an exterior diffusing section 256 defining at least two outlets 248 through which a cooling fluid flow (C) flows. Each section can have first, second, third, and fourth cross-sectional areas (CA1, CA2, CA3, CA4) respectively. The at least one connecting metering section 254 can extend with a constant third cross-sectional area (CA3) in the cooling fluid flow (C) direction to fluidly couple the interior diffusing section 252 to the exterior diffusing section 256. It should be understood that while illustrated as having a constant cross-sectional area, the third cross-sectional area (CA3) can also be decreasing as discussed herein with respect to cooling hole 134, and a constant cross-sectional area (CA3) is for illustrative purposes and not mean to be limiting. Likewise, cooling hole 134 can include a constant cross-sectional area (CA3) as described with respect to cooling hole 234.

Figure 5B:
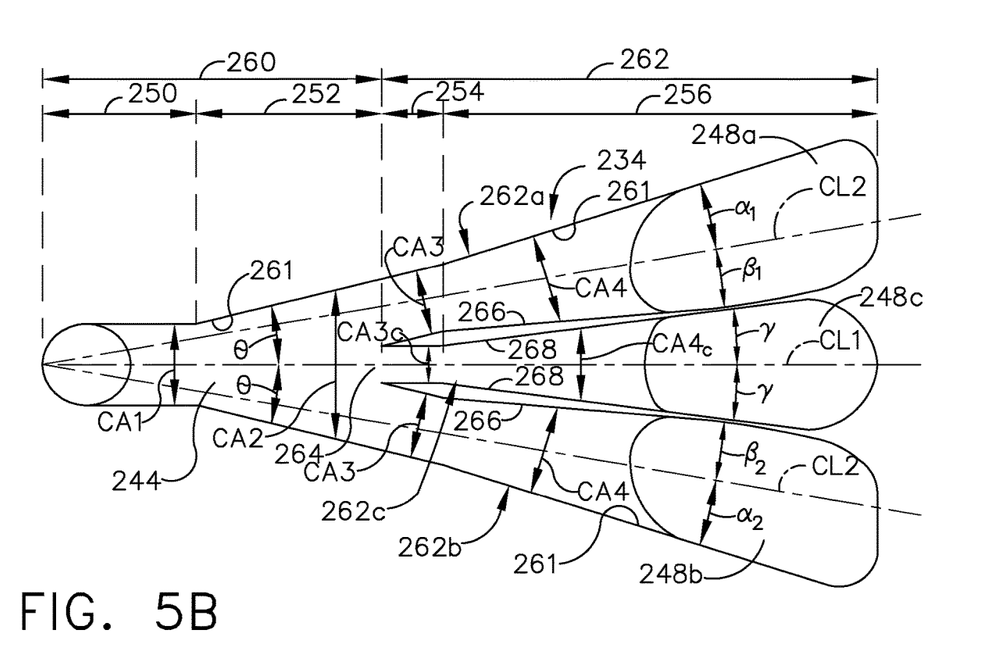
FIG. 5B is a schematic top sectional view of the at least one cooling hole in FIG. 4A.

FIG. 5B more clearly illustrates that the cooling hole 234 can be a furcated cooling passage 244 terminating in three outlets 248a, 248b, 248c. A trunk 260 defines a portion of the cooling hole 234 in which the interior diffusing section 252, and by way of non-limiting example, the interior metering section 250 can be formed. The interior diffusing section 252 terminates in branches 262, by way of non-limiting example three branches 262a, 262b, 262c, forming exterior diffusing sections 256. It is further contemplated that the branches 262 form connecting metering sections 254. Branch 262c can form a middle connecting metering section 254 defining a cross-sectional area (CA3c) that can be smaller than the cross-sectional areas (CA3) of the other metering sections 254 in branches 262a, 262b. Likewise, the exterior diffusing section 256 formed by the third branch 262c can define a cross-sectional area (CA4c) smaller than the cross-sectional areas (CA4) of the other exterior diffusing sections 256. It is further contemplated that each branch 262 forms connecting metering sections 254 and exterior diffusing sections 256 all having similar cross-sectional areas to each other.

The furcated cooling passage 244 can include continuous sidewalls 261 extending from an inlet 246 to exterior outlets 248a, 248b. A first side angle ⊖ can be measured from a first centerline (CL) of the interior diffusing section 252 to the continuous sidewalls 261. A second side angle α, illustrated as two second side angles $α_1$, $α_2$, can be measured from second centerlines (CL2) of the exterior diffusing section 256 to the sidewalls 261. It is contemplated that the first side angle Θ is greater than the second side angle α. By way of non-limiting example the first side angle Θ is 7° and the second side angle α is 5°.

Each of the first and second branches 262a, 262b can define interior sidewalls 266 opposite the continuous sidewalls 261. A third side angle β, illustrated as two third side angles $β_1$, $β_2$ can be measured from the second centerlines (CL2) to the sidewalls 266. It is contemplated that the third side angle β is less than both the first side angle Θ and second side angles $α_1$, $α_2$.

The third branch 262c can be a middle branch forming a third exterior diffusing section 256 having another set of interior sidewalls 268. A fourth side angle γ can be measured from the other set of interior sidewalls 268 to the first centerline (CL1).

Figure 6A:
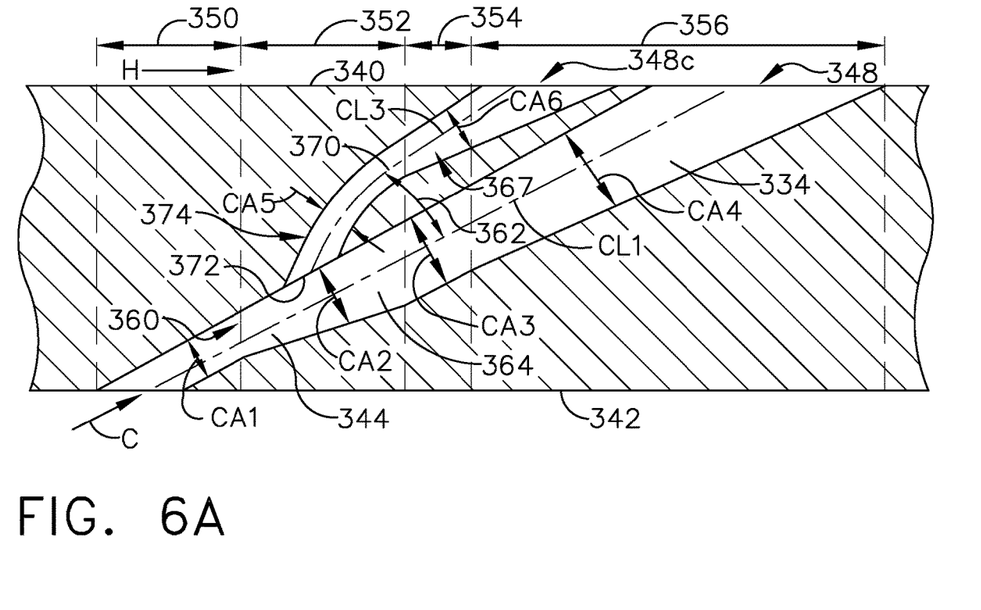
FIG. 6A is a schematic side sectional view of the at least one cooling hole from FIG. 2 according to yet another aspect of the disclosure discussed herein.

FIG. 6A is a cooling hole 334 according to another aspect of the disclosure discussed herein. The cooling hole 334 is substantially similar to the at least one cooling hole 134 of FIG. 4A. Therefore, like parts will be identified with like numerals increased by 100, with it being understood that the description of the like parts of the at least one cooling hole 134 applies to the cooling hole 334 unless otherwise noted.

The cooling hole 334 can include in fluid communication, an interior metering section 350, an interior diffusing section 352, at least one connecting metering section 354, and an exterior diffusing section 356 defining at least two outlets 348 through which a cooling fluid flow (C) flows. It is contemplated that the cooling hole 234 includes a furcated cooling passage 344 having a trunk 360 which extends to a junction 364 from which branches 362 extend. At least one branch 362 can form a secondary cooling hole 370 extending from a secondary inlet 372 at the junction 364. The at least one branch 362 forming the secondary hole 370 can define an additional centerline, illustrated as a curvilinear centerline (CL3).

The secondary inlet 372 can be fluidly coupled, by way of non-limiting example, to the interior diffusing section 352. The secondary cooling hole 370 can extend from the secondary inlet 372 to an outlet 348c along the curvilinear centerline (CL3). It is further contemplated that the secondary cooling hole 370 can include a secondary metering section 374 defining a constant cross-sectional area (CA5). The secondary metering section 374 can fluidly couple the interior diffusing section 352 to a secondary diffusing section 376 having an increasing cross-sectional area (CA6) and defining the outlet 348c.

Figure 6B:
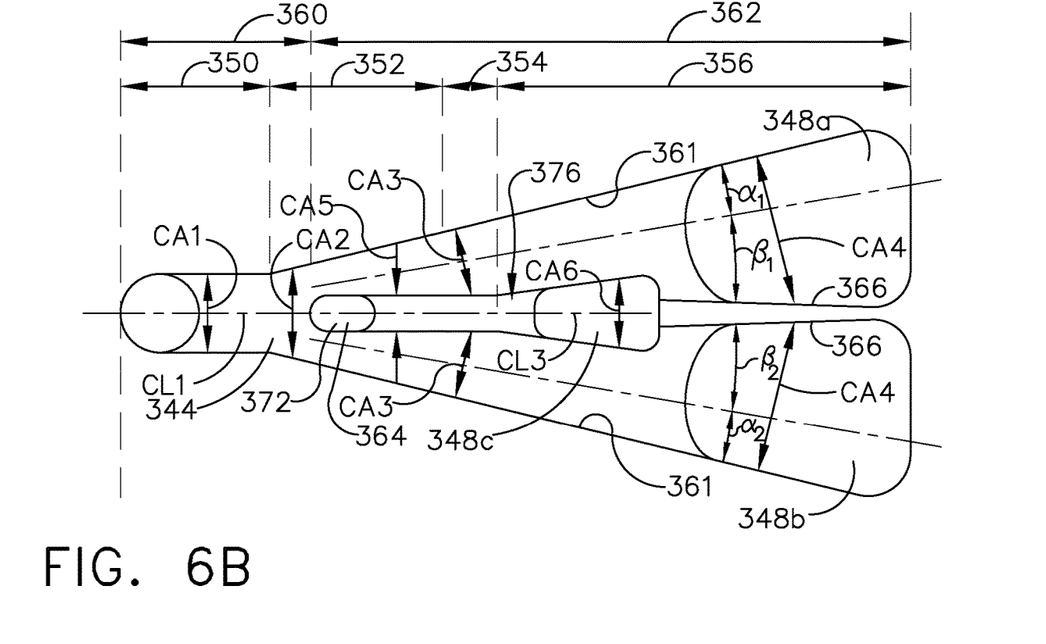
FIG. 6B is a schematic top sectional view of the at least one cooling hole in FIG. 4A.

As can more clearly be seen in FIG. 6B, the outlet 348c can be located upstream from outlets 348a, 348b with respect to cooling fluid flow C. It is also contemplated that the secondary cooling hole 370 includes at least a portion that extends parallel to the first centerline (CL) which is defined at least in part by the interior diffusing section 352.

While illustrated as linear, it is further contemplated that the first centerline (CL1) or second centerlines (CL2) as described herein can also be curvilinear like the curvilinear centerline (CL3) described herein. The curvature of the furcated cooling passages 144, 244, 344 as described herein is not meant to be limiting and can be curved or linear depending on location and function of the cooling holes 134, 234, 334.

The cooling holes with furcated cooling passages as described herein increase the cooling film performance when compared to a single outlet cooling hole. Diffusing the cooling fluid flow multiple times before exhausting the cooling fluid along the exterior of the outer wall as described herein minimizes jet penetration. Branching the cooling hole as described herein forms outlets that are close together which maximizes coverage along the exterior of the engine component, by way of non-limiting example the blade as described herein. The durability and performance of the engine as a whole is increased.

The furcated cooling passages can be manufactured utilizing additive manufacturing technologies or other advanced casing manufacturing technologies such as investment casing and 3-D printing. The technologies available provide cost benefits along with the other benefits described. It should be understood that other methods of forming the cooling circuits and cooling holes described herein are also contemplated and that the methods disclosed are for exemplary purposes only.

It should be understood that any combination of the geometry related to the orientation of the first and second tip portions with respect to each other and the tip channel is contemplated. The varying aspects of the disclosure discussed herein are for illustrative purposes and not meant to be limiting.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine, which generates a hot gas, and provides a cooling fluid flow, comprising:
    an outer wall separating the hot gas from the cooling fluid flow and having a heated surface along which the hot gas flows and a cooled surface facing the cooling fluid flow; and
    at least one cooling hole comprising an inlet at the cooled surface and at least two outlets at the heated surface, a furcated cooling passage having a trunk extending from the inlet and branches extending from the trunk to the at least two outlets, with an interior diffusing section formed in the trunk at a junction with the branches and exterior diffusing sections defining the at least two outlets; and
    at least one connecting metering section having a decreasing cross-sectional area along a flow direction through the at least one cooling hole located between the interior diffusing section and the exterior diffusing sections.

2. The component of claim 1 wherein the interior diffusing section defines a first centerline and the branches define additional centerlines.

3. The component of claim 2 wherein the at least two outlets are asymmetrical about the branch centerlines.

4. The component of claim 2 wherein at least one of the branch centerlines is curved.

5. The component of claim 2 wherein the interior diffusing section and the exterior diffusing sections share at least one continuous sidewall.

6. The component of claim 5 wherein the interior diffusing section comprises a first side angle measured along the at least one continuous sidewall with respect to the first centerline and the exterior diffusing sections comprises second side angles defined by the angle between the at least one continuous sidewall and the branch centerlines.

7. The component of claim 6 wherein the first side angle is greater than the second side angles.

8. The component of claim 1 wherein the at least two outlets is three outlets.

9. The component of claim 1 further comprising an interior metering section in the trunk and fluidly coupled to the interior diffusing section.

10. The component of claim 1 wherein the outer wall comprises a thickened wall portion proximate the inlet to extend a length of the interior diffusing section.

11. The component of claim 1 wherein the interior diffusing section and the exterior diffusing sections have increasing cross-sectional areas in the direction of the cooling fluid flow.

12. The component of claim 11 wherein the increasing cross-sectional areas are continuously increasing.

13. The component of claim 1 wherein a cumulative cross-sectional area of the exterior diffusing sections is greater than a cross-sectional area relative to the interior diffusing section.

14. An airfoil for a turbine engine, which generates a hot gas, and provides a cooling fluid flow, comprising:
an outer wall separating the hot gas from the cooling fluid flow and having a heated surface along which the hot gas flows and a cooled surface facing the cooling fluid flow;
at least one cooling hole comprising an inlet at the cooled surface and at least two outlets at the heated surface, a furcated cooling passage having a trunk extending from the inlet and branches extending from the trunk to the at least two outlets, with an interior diffusing section formed in the trunk at a junction with the branches and exterior diffusing sections defining the at least two outlets; and
at least one connecting metering section defining a constant cross-sectional area located between the interior diffusing section and the exterior diffusing sections.

15. The airfoil of claim 14 wherein the interior diffusing section defines a first centerline and the exterior diffusing sections define second centerlines and the at least two outlets are asymmetrical about the second centerlines.

16. The airfoil of claim 15 wherein the at least one of the first or second centerlines are curved.

17. The airfoil of claim 14 wherein the at least two outlets is three outlets.

18. The airfoil of claim 14 further comprising an interior metering section in the trunk and fluidly coupled to the interior diffusing section.

19. The airfoil of claim 14 wherein the outer wall comprises a thickened wall portion proximate the inlet to extend a length of the interior diffusing section.

20. A method of cooling an engine component with at least one cooling hole extending through an outer wall of the engine component between an inlet along a cooled surface facing a cooling fluid flow and at least two outlets along a heated surface along which hot gas flows; the method comprising:
flowing the cooling fluid flow through an interior diffusion section of the at least one cooling hole to form a first diffused airflow;
splitting the first diffused airflow into multiple branches;
metering the first diffused airflow through a connecting metering section in each of the multiple branches having a decreasing cross-sectional area within the connecting metering section;
diffusing the first diffused airflow in each of the multiple branches after flowing the first diffused airflow through the connecting metering section to form a second diffused airflow; and
emitting the second diffused airflow onto the heated surface.

21. The method of claim 20 further including flowing the cooling fluid flow through an interior metering section prior to flowing the cooling fluid flow through the interior diffusing section.

* * * * *